US 8,884,982 B2

(12) United States Patent
Runge et al.

(10) Patent No.: US 8,884,982 B2
(45) Date of Patent: Nov. 11, 2014

(54) METHOD AND APPARATUS FOR IDENTIFYING SPEAKERS AND EMPHASIZING SELECTED OBJECTS IN PICTURE AND VIDEO MESSAGES

(75) Inventors: Fred Runge, Wuensdorf (DE); Thomas Scheerbarth, Berlin (DE)

(73) Assignee: Deutsche Telekom AG, Bonn (DE)

( * ) Notice: Subject to any disclaimer, the term of this patent is extended or adjusted under 35 U.S.C. 154(b) by 677 days.

(21) Appl. No.: 12/968,480

(22) Filed: Dec. 15, 2010

(65) Prior Publication Data

US 2011/0141106 A1    Jun. 16, 2011

(30) Foreign Application Priority Data

Dec. 15, 2009  (EP) ..................................... 09179315
Dec. 15, 2009  (EP) ..................................... 09179316

(51) Int. Cl.
*G09G 5/00*      (2006.01)
*G06T 13/40*     (2011.01)
*G06K 9/00*      (2006.01)
*G06K 9/62*      (2006.01)
*G10L 17/00*     (2013.01)
*G10L 17/10*     (2013.01)

(52) U.S. Cl.
CPC ............... *G06T 13/40* (2013.01); *G10L 17/005* (2013.01); *G06K 9/00221* (2013.01); *G06K 9/6293* (2013.01); *G10L 17/10* (2013.01)
USPC ........................... 345/619; 345/419; 345/473

(58) Field of Classification Search
CPC ....... G06T 15/005; G06T 19/00; G06T 17/20; G06T 13/00; G06T 13/40; G06T 2207/10016; G06K 9/48
USPC .................. 345/619, 156, 419, 473; 455/420; 709/206; 382/190
See application file for complete search history.

(56) References Cited

U.S. PATENT DOCUMENTS 4,925,294 A    5/1990  Geshwind et al.
5,757,690 A    5/1998  McMahon
(Continued)

FOREIGN PATENT DOCUMENTS

DE            69628662 T2    4/2004
DE    10 2004 014 189 A1   10/2005
(Continued)

OTHER PUBLICATIONS

European Search Report for EP 09 17 9315, dated May 6, 2010.
(Continued)

*Primary Examiner* — Chante Harrison
(74) *Attorney, Agent, or Firm* — Leydig, Voit & Mayer, Ltd.

(57) ABSTRACT

A method for emphasizing selected objects in digital data of at least one of pictures and video that is stored in digital messages, the messages including sender addresses and being stored in a memory system of a digital messaging system for a plurality of users, includes the step of identifying picture regions including at least one of faces and persons in the digital data of the messages on the digital messaging system having the same sender address. Sender-relevant picture regions in the identified picture regions that represent a sender of the message are determined based on at least one of: a) a comparison with a reference picture of the sender stored on the memory system; b) a comparison of speech data in the digital data with reference speech data using at least one of speaker recognition methods, speaker verification methods and speaker identification methods, taking into account picture data and speech data in the message; and c) a frequency of occurrence of the identified picture regions in the messages that have the same sender address. The digital data of the messages is then modified so as to emphasize the sender-relevant picture region.

15 Claims, 4 Drawing Sheets

(56) References Cited

U.S. PATENT DOCUMENTS

| | | | |
|---|---|---|---|
| 6,477,267 B1 | 11/2002 | Richards | |
| 7,701,437 B2 * | 4/2010 | Thursfield | 345/156 |
| 7,809,117 B2 | 10/2010 | Runge et al. | |
| 8,504,928 B2 * | 8/2013 | Tanaka | 345/473 |
| 2004/0107106 A1 * | 6/2004 | Margaliot et al. | 704/270 |
| 2011/0212717 A1 * | 9/2011 | Rhoads et al. | 455/420 |
| 2012/0124143 A1 * | 5/2012 | Chung et al. | 709/206 |
| 2012/0317210 A1 * | 12/2012 | Fisher et al. | 709/206 |

FOREIGN PATENT DOCUMENTS

| | | |
|---|---|---|
| DE | 10 2007 010 662 A1 | 9/2008 |
| EP | 0 991 023 B1 | 12/2004 |
| EP | 1 648 151 A1 | 4/2006 |
| EP | 1 412 917 B1 | 4/2008 |
| WO | WO 2004/054216 A1 | 6/2004 |
| WO | WO 2006/047347 A1 | 5/2006 |

OTHER PUBLICATIONS

European Search Report for EP 09 17 9316, dated May 6, 2010.
Office Action from European Patent Office for corresponding application No. 09 179 316.6 dated Nov. 21, 2012.
Response to Office Action dated Nov. 27, 2013.
Notice of Allowance from European Patent Office for application No. 09 179 316.6 dated Apr. 26, 2013.
Listing of claims deemed allowable in Doc. AQ.

* cited by examiner

Fig. 2b background with objects device camera   Fig. 3a background with objects device camera   Fig. 3b

METHOD AND APPARATUS FOR IDENTIFYING SPEAKERS AND EMPHASIZING SELECTED OBJECTS IN PICTURE AND VIDEO MESSAGES

CROSS-REFERENCE TO PRIOR APPLICATIONS

Priority is claimed to European Patent Application No. EP 09179315.8, filed Dec. 15, 2009, and to European Patent Application No. EP 09179316.6, filed Dec. 15, 2009, the entire disclosure of each of which being hereby incorporated by reference herein.

FIELD

The invention relates to a method for controlling a digital messaging system in which a multiplicity of person-related messages are stored on a memory system.

BACKGROUND

Messaging systems (mobile box, voicemail systems) are sufficiently known in the market. Depending on the system structure, speech messages, picture messages and/or video messages are also often stored as attachments to text messages (email attachments), together with sender information (e.g. sender identification, e.g. CLI (Calling Line Identification), HLR (Home Location Register), sender address, and similar), as complete video messages in video mailboxes based on video telephony, in a manner analogous to voice mailboxes or digital answering machines, which have been in existence for a long time.

It can also be assumed as generally known prior art that, in computer-animated application, use is made of avatars equipped with functionalities that enable texts to be output through application of speech synthesis, with corresponding lip movements being derived and represented. Through means for face detection and determination of facial portions filled by particular facial elements (e.g. lips), lip movements of a speaker that have been recorded by means of a camera can be inserted in the lip region of a still photo, which can assume the role of an avatar.

It is described in EP1648151A1 that messages are stored for subsequent processing for a system for machine translation of further messages. In this case, however, the emphasis is on the evaluation of textual and phonetic information contained in the stored messages. This also applies to picture messages, which might possibly contain texts in the picture or in meta information. In this case, modification of the actual picture contents is not described.

Described in WO 2006/047347 is a method wherein an AVATAR can be added to a message individually by a user.

The representation of pictures in picture messages or video messages is effected two-dimensionally, since the recording methods used in telecommunications terminal devices are based on these terminal devices being equipped with a camera. Additional equipment, with more than two cameras in combination with transmission methods that require a higher bandwidth, is obvious, but is not advisable in more compact devices, owing to a lesser base width and the resultant low 3D quality. A 3D representation of the speaker of a picture and/or video message is therefore possible only with greatly impaired quality.

Also 2D avatars, which, as described above, can be generated from photos, can therefore be extended to 3D animations, by means of two simultaneously recorded pictures in each case, only to a limited extent and with impaired quality.

At the same time, methods for three-dimensional representation of pictures and/or videos are making ever greater progress, such that, here likewise, a requirement arises for 3D representation of video/picture messages.

Likewise known is the 2D representation of virtually generated, animated avatars, which exist as a complete 3D model within a system and which, for example, reproduce texts on a system consisting of a display and loudspeaker, without a right and a left picture being generated simultaneously in this case (for example, as described in DE102004014189A1).

A true 3D representation of objects or pictures is based on the (quasi-) simultaneous output of two 2D pictures, one picture being intended for the left eye and the second picture being intended for the right eye.

The recording by means of laterally offset cameras for the purpose of generating 3D pictures is known generally, and is not to be described here. Methods also exist for generating artificial 3D pictures from a single 2D picture, from existing models, the basis of which is constituted by a complete 3D model of manually annotated/analysed 2D objects, which is represented by the spatial coordinates of a greater number of points on the surface of the objects. Examples of this are EP1412917B1 and EP0991023B1.

For the purpose of viewing 3D representations, there are various methods using aids, e.g. by means of lens rasters, anaglyph methods, polarisation spectacles, etc.

Also, two 2D pictures provided for the right and the left eye can be viewed without aids, through cross-viewing or parallel viewing.

In U.S. Pat. No. 4,925,294A1 it was attempted to describe a general method for generating a 3D picture from a single 2D picture by separating various foreground and background picture elements and, from knowledge of their 3D characteristics, generating a right picture and a left picture, respectively, from the 2D picture. In the following description, the generating process always requires two 2D pictures, from which one 2D right picture and one 2D left picture, respectively, is then generated, i.e. the described knowledge of the properties of individual objects or of object models is not required in the method described below.

SUMMARY

In an embodiment, the present invention provides a method for emphasizing selected objects in digital data of at least one of pictures and video that is stored in digital messages, the messages including sender addresses and being stored in a memory system of a digital messaging system for a plurality of users. The method includes the step of identifying picture regions including at least one of faces and persons in the digital data of the messages on the digital messaging system having the same sender address. Sender-relevant picture regions in the identified picture regions that represent a sender of the message are determined based on at least one of: a) a comparison with a reference picture of the sender stored on the memory system; b) a comparison of speech data in the digital data with reference speech data using at least one of speaker recognition methods, speaker verification methods and speaker identification methods, taking into account picture data and speech data in the message; and c) a frequency of occurrence of the identified picture regions in the messages that have the same sender address. The digital data of the messages is modified so as to emphasize the sender-relevant picture region.

BRIEF DESCRIPTION OF THE DRAWINGS

The figures are described in detail in the following exemplary embodiments. However, the invention is not limited to the exemplary embodiments. Other features and advantages of various embodiments of the present invention will become apparent by reading the following detailed description with reference to the attached drawings which illustrate the following:

FIGS. 2a-3b show the schematic method for determining pictures for a 3D representation.

DETAILED DESCRIPTION

The invention relates to a video and/or picture messaging system and relates, in particular, to a method and an arrangement by means of which messages that are transmitted within the scope of the system, for example via a mailbox, are represented to a recipient with additional 3D information content or with emphasizing, in which picture information about the speaker of the messages is included.

The recipient is to be offered, in a form that is as authentic as possible, messages having an improved information content relating to message speakers, the information content creating with the recipient a spatial impression that is not visible from the sent 2D original message alone.

In an embodiment, the present invention provides the representation or emphasizing of the person who has left the message, as a virtual speaker, through searching of pictures from the messages and animation thereof.

In particular, the speakers are shown in a 3D representation, the real speaker being based, for the system described in the following, on the simultaneous or quasi-simultaneous (period within a few milliseconds, which are scarcely perceptible by the viewer) output of two 2D pictures of message speakers, one picture being intended for the left eye and the second picture being intended for the right eye.

For the purpose of emphasizing a speaker, in particular 3D-emphasized representation, current 2D picture messages of past picture and/or video messages of the same speaker are searched for in the mailbox system by evaluation of the sender information, this information is extracted from the pictures and adapted in its size to a uniform size of the speaker representation. In this case, differing perspectives (left and right pictures) of the 2D individual recordings of the speaker are processed, with differences in brightness and/or in colour being adapted to form a 3D image.

a. For the purpose of 3D representation of a speaker of a current 2D video message, the speaker figures are extracted from the single pictures of a video message and/or, additionally, from past video/image messages of the same speaker (with evaluation of the sender information), adapted in their size to a uniform size of the speaker representation, and differing perspectives of the recordings of the speaker present in the same video recording, past video recordings and/or pictures of the speaker are processed to form a 3D image of the speaker, with adaptation of differences in brightness and/or in colour.

b. For the purpose of 3D representation of a speaker of current text and/or voice messages, the sender information of the messages (e.g. email, voicemail, . . . ) is evaluated, and 2D picture messages and/or 2D video messages and/or already compiled 3D images of this speaker are searched for in the mailbox system, and this information is extracted from the messages, adapted in its size to a uniform size of the speaker representation, and differing perspective of the recordings of the speaker are processed to form a 3D image, updated if appropriate, with adaptation of differences in brightness and/or colour.

c. For the purpose of 3D/2D representation of a speaker of current messages of picture and/or video messages for which there is no available information, replace by any existing 2D/3D image of another speaker, which can be preset by the recipient, if appropriate.

d. Alternatively, the picture and/or video data of the received messages can finally be modified through emphasizing of the sender-relevant image region with the data generated under a) and b).

To enable pictures to be assigned to particular units (e.g. persons), these pictures are stored together with addresses/sender identifications (such as, for example, home location register (HLR), calling line identification (CLI), IP address, email address, personal identifications, . . . ), or similar address information, as is the case, for example, for video messages and, consequently, the picture information therein, if appropriate.

In a possible embodiment, addresses/identifications of a person that differ from one another must be converted to a unique identification if, for example, storage of messages is effected via differing communication techniques.

Further details can be learned from the claims, which are also part of the description.

In detail, the system is a digital messaging system in which a multiplicity of person-related messages are stored in a storage system. Preferably in this case, this is at least one stationary server, which accesses the storage system. Clearly, mobile terminal devices can also be taken into account. The messages can be SMS, email, MMS, picture/video messages, voice messages, etc., which are preferably received by a central server, in order then to provide the messages again, e.g. via a web front-end, or to enhance them in such a way that they can be converted, by client or client/server applications, to 2D or 3D and represented. It is also conceivable, clearly, for all operations to run on a mobile terminal device, and for a video film, which then optically represents the message on the PDA, telephone, etc., to be attached to the message. The messages are provided with sender addresses (e.g. email, telephone number, etc.), and a portion of the messages further comprises digital picture data or video data. The data in this case is data having differing attachments, such as video or picture attachments.

Further components are a unit for identifying picture regions having faces and/or persons in the digital picture data or video data that have the same sender address. Normally, this is performed by known picture/face recognition processes, which run on a processor.

A further unit serves to determine sender-relevant picture regions from the identified picture regions on the basis of reference pictures that are stored on a memory system. In this case, the picture of the sender is to be determined, in order to generate therefrom a 2D/3D model of a virtual speaker. Such a method can be based on reference pictures that are stored so as to correspond (e.g. in tabular form) to a sender address. If no such picture exists, the picture of the sender can be ascertained on the basis of voice recognition methods, taking account of voice data in the message, in reference voice data, or of voice data in the video data, which are compared with each other. In this case, the voice data within a video is compared, for example, with voice samples/voice models from messages that have been delivered by the same sender. The method can run on a standard processor having corresponding software.

In an alternative embodiment, the frequency of occurrence of picture regions in messages having the same sender address is determined. Here, it is then possible to work, for example, across mailboxes, such that the person who occurs most frequently is determined as the sender.

Finally, the picture data and/or video data of the received messages is modified through emphasizing or animation of the sender-relevant picture region. The emphasizing can be achieved through differing colours and brightness and sizes. Also, alternatively, an animation can be effected in a 2D or 3D engine, which, likewise, can be a software, by means of at least one processor, a determination of the sender-relevant picture region being performed in order to generate in this region a digital, graphic model of a speaker that reproduces the content of the message through animation of mouth regions.

In a preferred embodiment, the emphases can be undone through information via overlays or through provision of a backup copy. It is also possible for regions that have been altered to be backed-up and made such that they can be copied back.

Additionally provided is a unit having an interface (processor) for storing the identified sender-relevant 2D picture region in conjunction with the sender address and parameters that characterize the perspective of the sender image. In this case, the perspective and the body position of the sender are determined through known picture recognition methods. Additionally known is an interface for transferring the sender-relevant 2D picture region and further sender-relevant picture regions from past messages from the memory system to a module for generating 3D picture data.

Further, means are known for determining the perspective/orientation of the 2D image on the basis of imaged body proportions. In order to generate a 3D model, means are required to search for a second 2D image for the 3D impression. In this case, attention is paid to a necessary second orientation, through evaluation of the ratios of body proportions and/or changes in the position against the background, which proportions and/or changes can be evaluated by machine (in particular, by extracting facial features or body elements and their proportions in relation to one another). These, again, are characterized by parameters that describe a different perspective in the same horizontal plane.

In addition, means are used to generate at least one 3D image of the message speaker by supplementing the original 2D picture with a second picture, which is copied from the latter picture and in which the sender image is cut out and replaced by a picture from a different perspective, the means for searching for the second image being realized in such a way that, in the search for a second 2D image, searching is first performed in the current message for pictures (e.g. of a video message as a sequence of pictures) from a different perspective, preferably through use of face recognition methods in the case of a plurality of persons being present. If no further utilizable pictures from a different perspective are present in the current message, then the memory system is searched, preferably in the archive memory of the messaging system. This can also be effected, for example, as a batch routine overnight, such that a multiplicity of information is already available before it is requested. Preferably in this case, the proportions of features of the sender image of the additionally found pictures from a different perspective are checked for compliance with predefined limit values. These limit values can be determined by the position, the colours, the resolution and the quality of the picture. Other limit values describe a horizontal recording plane (recording angle in the vertical) and a vertical recording plane (recording angle in the horizontal).

There has been described an internet-based mailbox system, consisting of person-related message memories, which system is additionally equipped with at least one module for storing sender address data and therewith associated picture data of message senders, for the purpose of collecting this image data and generating 3D picture data of the senders from 2D picture data, in order then to emphasize the user in the picture data.

The method for identifying and verifying and/or emphasizing message senders for the purpose of generating 3D messages or emphasizing background regions in picture or video messages is further characterized in that 1) pictures, or video information as a sequence of pictures, that accompany messages are stored in conjunction with the sender data, 2) in these pictures, regions that represent faces and/or persons are identified, or detected, 3) these regions are compared with at least one reference picture of the sender of the respective message from the memory module, for the purpose of identifying a picture region as sender-relevant, reference pictures of the sender being obtained from verified and archived picture and/or video messages of the same sender.

In addition, it can be verified, through use of speaker recognition methods, whether the speaker of the message corresponds to the sender identified by an identification/sender address. The face recognition and speaker recognition are then combined to form a verification result.

The message, or a picture region of the message, is identified as sender-relevant:
  determination of the perspective/orientation of the sender-relevant picture region (2D image) on the basis of imaged body proportions
  storage of the identified sender-relevant picture region, including perspective/orientation, in conjunction with the address data of the sender and as a further reference picture of the sender
  transfer of the sender-relevant picture region and further sender-relevant picture regions, including perspective/orientation from past messages, from the above-mentioned memory to a module for generating 3D picture data or emphasizing the picture data.

A further aspect is an Internet-based mailbox system, consisting of person-related message memories, which system is additionally provided with at least one module for storing sender address data and therewith associated picture data of message senders, for the purpose of collecting this image data and generating 3D picture data of the senders from 2D picture data.

The method for generating 3D images of message senders is characterized in that 1) pictures, or video information as a sequence of pictures, that accompany messages are stored in conjunction with the sender data, 2) in these pictures, regions that represent faces and/or persons are identified, or detected, 3) these regions are compared with at least one reference picture of the sender of the respective message from the memory module, for the purpose of identifying a picture region as sender-relevant,
  If a picture region is identified as sender-relevant:
    storage of the identified sender-relevant 2D picture region in conjunction with the address data of the sender and the parameters characterizing the perspective of the sender image transfer of the sender-relevant 2D picture region and further sender-relevant picture regions from past messages from the above-mentioned memory to the module for generating 3D picture data determination of the perspective/orientation of the 2D image on the basis of imaged body proportions generation or adaptation of a 3D model of the sender present in the above-mentioned memory, through storage of the ascertained sender-relevant picture region in the above-mentioned memory of the mailbox system storage of information, characterizing the various perspectives/orientation of the model of the sender, in the above-mentioned memory of the mailbox system search for a second 2D image relating to the received image in the context of the second orientation necessary for the 3D impression, through evaluation of the ratios of body proportions through search for an image of the sender that is characterized by parameters that describe a different perspective in the same horizontal plane.

In this case, searching is first performed in the current message (e.g. video mail) for pictures from a different perspective, with use of face recognition methods, if appropriate, in the case of a plurality of persons being present If no further utilizable pictures from a different perspective are present in the current message, then the archive memory of the mail system is searched In this case, checking of the proportions of features of the sender image of the additionally found images from a different perspective for compliance with predefined limit values, which describe the horizontal recording plane (recording angle in the vertical) and which describe the vertical recording plane (recording angle in the horizontal)

adaptation of size or colour of the found image to be inserted generation of at least one 3D image of the message speaker by supplementing the original 2D picture with a second picture, which is copied from the later picture and in which the sender image is cut out and replaced by a picture from a different perspective modification of the picture information of the received message and emphasizing of the message speaker through insertion of at least a part of the 3D model into the ascertained perspective in place of the sender-relevant picture regions of the second picture.

In the case of the generation of 3D animations, information that characterizes differing perspectives of the images of the sender in the messages is stored in the above-mentioned memory of the mailbox system. The 3D model of a speaker in this case consists of a multiplicity of 2D images, which are stored in conjunction with data that describes the perspective/orientation of a single 2D image.

There has been described an Internet-based mailbox system for storing and transmitting picture or video messages, wherein the speakers of the messages are emphasized in a particular manner, which system is equipped with person-related message memories, and additionally at least one module for storing sender address data and therewith associated picture data of message senders, for the purpose of collecting this picture data and generating 3D picture data of the senders from 2D picture data.

In addition, the background of the speaker can be produced in a location-dependent manner, with evaluation of location-related information of the sender.

Figure 1:
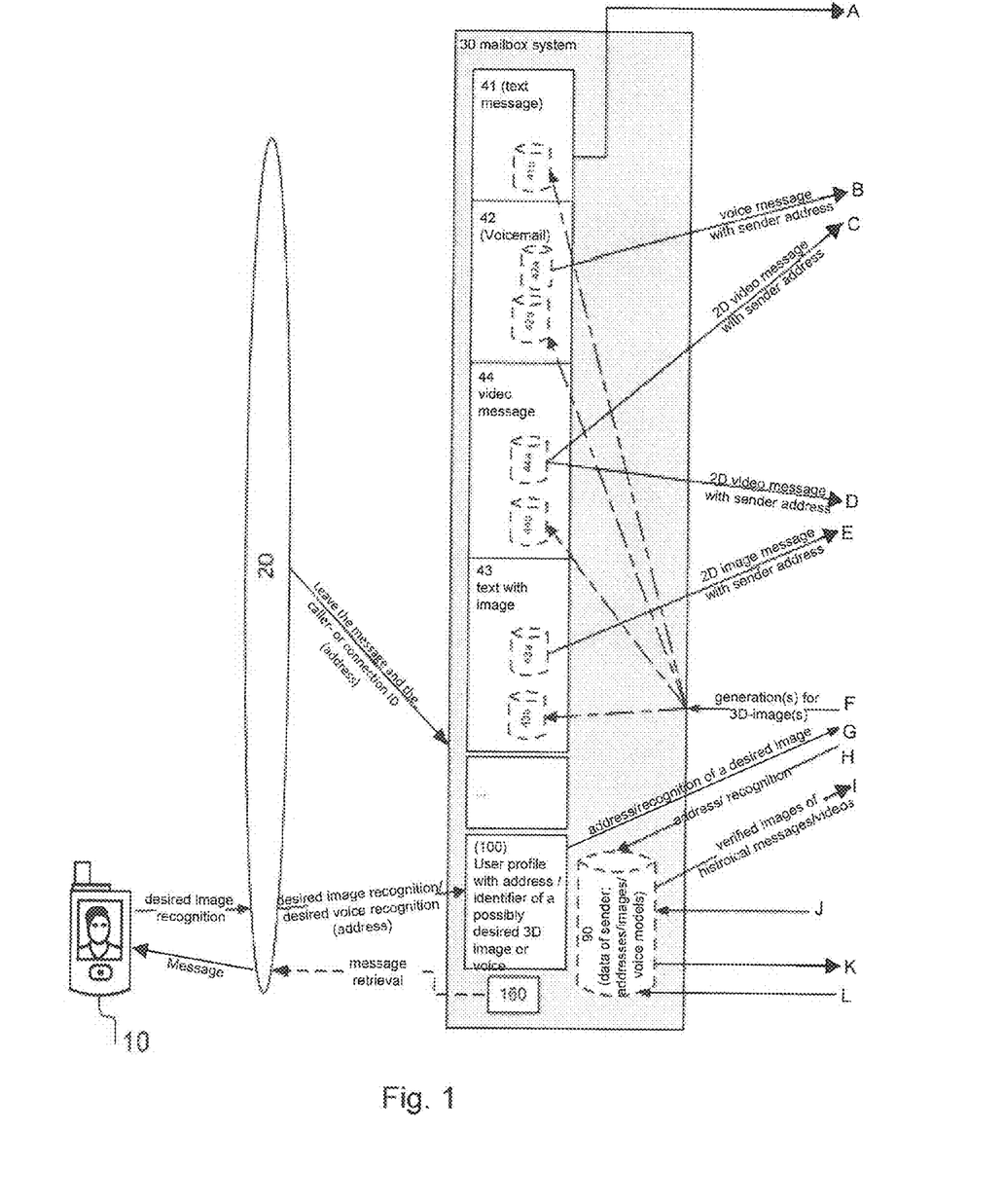
FIG. 1 shows a schematic structure of the messaging/mailbox system having differing mailboxes and mobile terminal devices.

The mailbox system 30, the 3D generation 60, the speaker recognition 70 and the face recognition 80, which are represented in FIG. 1, can also be located locally, in their entirety or partially, on the terminal device. If the mailbox system, including 90, is located on the terminal device, there is available in 90, if appropriate, only sender data with which the user of the terminal device has had contact.

In a network-based mailbox system 30, there might also be available sender data (e.g. pictures, videos, address data) from messages that have been sent to other receivers.

The advantage of the method types described above consists in that messages or picture/video messages having two-dimensional picture information (pictures, videos) of an object (e.g. the speaker) can be reproduced as 3D messages. Or, that the sender and speaker is emphasized in a particular manner, such that the recipient can unambiguously identify the speaker of the message, even in the case of ambiguous background conditions (e.g. a plurality of other persons in the picture). In addition, messages that do not contain any picture information in the original can be evaluated through supplementarily generated picture/video information, with emphasizing of the focussed speaker or of the background.

If only one identified object within the 2D message is converted to a 3D object, there is the resultant advantage of an additional emphasizing of the focussed object in front of a 2D background, or in a 2D environment.

For the system described in the following, a true 3D representation of real speakers within the picture data or video data is based on the simultaneous or quasi-simultaneous output of two 2D pictures of message speakers, one picture being intended for the left eye and the second picture being intended for the right eye.

For the purpose of 3D representation of a speaker of current 2D picture messages, past picture and/or video messages of the same speaker are searched for in the mailbox system, with evaluation of the sender information, this information is extracted from the pictures and adapted in its size to a uniform size of the speaker representation, and differing perspectives (left and right pictures) of the 2D individual recordings of the speaker are processed to form a 3D image, with adaptation of differences in brightness and/or colour.

For the purpose of 3D representation of a speaker of current 2D video messages from the single pictures of a video message and/or additionally from past video/picture messages of the same speaker (with evaluation of the sender information), the speaker figures are extracted, adapted in their size to a uniform size of the speaker representation, and perspectives of the recordings of the speaker present in the same video recording, past video recordings and/or pictures of the speaker are processed to form a 3D image of the speaker, with adaptation of differences in brightness and/or colour.

For the purpose of 3D representation of a speaker of current text messages and/or voice messages, the sender information of the messages (e.g. email, voicemail, . . . ) is evaluated, and searching is performed in the mailbox system for 2D picture messages and/or 2D video messages and/or already compiled 3D images of this speaker, and this information is extracted from the messages (if this has not already happened, and the information stored), adapted in its size to a uniform size of the speaker representation, and differing perspectives of the recordings of the speaker are processed to form a 3D imaged, updated if appropriate, with adaptation of differences in brightness and/or colour.

For the purpose of 3D representation of a speaker of current messages, replace the real 2D speaker of picture and/or video messages by any existing 3D image of another speaker, which can be preset by the recipient, if appropriate.

For the purpose of 3D representation of a speaker of current text messages and/or voice messages, insert at least any one existing 3D image of at least one other speaker or of another artificial figure (e.g. avatar), which can be preset by the recipient, if appropriate.

To enable pictures to be assigned to particular units (e.g. persons), these pictures are stored together with addresses/sender identifications (such as, for example, home location register (HLR), calling line identification (CLI), IP address, email address, personal identifications, . . . ), or similar address information, as is the case, for example, for video messages and, consequently, the picture information therein, if appropriate.

If necessary, addresses/identifications of one person that differ from each other must be converted to a unique identification.

Other persons, other than the speaker, may also be visible on pictures/images (43a, 44a, FIG. 1) of the messages, such that it is expedient to verify the face of the message speaker. For this reason, on representations in the messages on which a plurality of faces are recognized, the representations of these faces are extracted. Through comparison with known faces of the message speaker identified on the basis of the speaker's address, the pictures are verified in succession or in parallel processes in the face recognition (80). The sender address is used to determine the reference faces/reference models/reference patterns necessary for the verification.

Subsequently, there is then only generated for the picture/video face region a 3D image whose verification, in comparison to the reference model from 50, ascertained via the address, produces a minimum value of correspondence (confidence) with the reference model of the sender, it being possible to define whether a fixed confidence limit value must be exceeded or not attained for the purpose of successful verification (this value can be between 70 and 80%).

That is to say, the generation of a 3D picture, or of 3D picture sequences (60), is preferably executed only in the case of the face in the picture/video message having been successfully verified (see FIG. 1). Pictures without detected faces, or without at least one successfully verified face of the sender, are not altered as part of this process.

For the purpose of additional safeguarding of the verification of the speaker of a video message, from which both pictures of the speaker (video=sequence of single pictures and preferably sound signals) and voice signals of the latter can be extracted, the verification of the face of the sender (according to the sender address) can be combined with the verification of the voice of the speaker, it is now additionally ascertained for this purpose, via the face recognition on the basis of implemented comparison models, whether a face with moving lips corresponds to that of the sender. If this is the case, the face of the speaker is verified on the basis of at least one reference model from 50 and/or 90 of the speaker identified through the sender address.

The verification result is stored in the form of a reliability score.

Likewise, the recorded voice of the speaker is verified on the basis of at least one reference model from 50 and/or 90 of the speaker identified through sender address.

The result of the speaker verification, in the form of a reliability score, is likewise stored.

The sequence of the two verifications is of no consequence for combined processing.

Combined with the face recognition, or conversely, the voice of the localized speaker can now additionally be evaluated by means of known methods of speaker verification/speaker recognition.

In the combination of results of the speaker verification, the face recognition and, if appropriate, the verification of other media, contradictory verification results, having differing reliability values, may possibly occur. Thus, on the exemplary premise of a uniform result range of 0 . . . 100 for the speaker verification (SV) and face recognition (GE), and the assumption that values of 0.80 mean a rejection and values of 81 . . . 100 mean the acceptance of the signals, it is quite possible that, for example, the SV delivers a value of 79 and the GE delivers a value of 81. The decision concerning generation of the decision signal becomes even more ambiguous if, in addition to the evaluation of more than two media signals, it is necessary to take as a basis, in the result values, differing reliability limit values for the individual results.

This problem can be solved, for example, with a normalization of the individual values and a weighted addition of the normalized values for the purpose of forming the decision value to be compared, e.g.:

$$Ew = Wsv^* \frac{Ssv - Ssv_{min}}{Ssv_{max} - Ssv_{min}} + Wge^* \frac{Sge - Sge_{min}}{Sge_{max} - Sge_{min}} + Wv3^* \frac{Sv3 - Sv3_{min}}{Sv3_{max} - Sv3_{min}} + \ldots + Wvn^* \frac{Svn - Svn_{min}}{Svn_{max} - Svn_{min}}$$

wherein

Ew—normalized decision value

Ssv—reliability score of the speaker verification $Ssv_{min}$—minimum value of the reliability score of the speaker verification $Ssv_{max}$—maximum value of the reliability score of the speaker verification Wsv—weighting factor for the normalized reliability score of the speaker verification Sge—reliability score of the face recognition $Sge_{min}$—minimum value of the reliability score of the face recognition $Sge_{max}$—maximum value of the reliability score of the face recognition Wv3—weighting factor for the normalized reliability score of the face recognition Sv3—reliability score of the face recognition $Sv3_{min}$—minimum value of the reliability score of the third verification (e.g. gesture recognition)

$Sv3_{max}$—maximum value of the reliability score of the third verification (e.g. gesture recognition)

Wv3—weighting factor for the normalized reliability score of the possibly third verification (e.g. gesture recognition)

Sv3—reliability score of the face recognition $Sv3_{min}$—minimum value of the reliability score of the third verification (e.g. gesture recognition)

$Sv3_{max}$—maximum value of the reliability score of the third verification (e.g. gesture recognition)

Wv3—weighting factor for the normalized reliability score of the third verification (e.g. gesture recognition)

Svn—reliability score of the nth verified medium $Svn_{min}$—minimum value of the reliability score of the nth verified medium $Svn_{max}$—maximum value of the reliability score of the nth verified medium Wvn—weighting factor for the normalized reliability score of the nth verified medium In the simplest case, in the case of equal normalized individual limit values and n=3, Wsv=Wge=Wv3=1/n=1/3 would apply here.

In the case of differing normalized individual limit values $Sg_n$, the normalized reliability scores $$S_n = \frac{Svn - Svn_{min}}{Svn_{max} - Svn_{min}}$$

are themselves adapted to a common, equal normalized limit value (GNG), such that it is again possible to work with equal weighting factors.

In the case of this type of normalization $Sn_{min}=0$ and $Sn_{max}=1$, the resolution of the second-order polynomial $$GNG = a_n Sg_n^2 + (1-a_n) Sg_n$$

can serve to calculate the value $a_n$ on the basis of the known values for GNG and $Sg_n$ (normalized score limit value for the nth verification).

A mean value of the individual, differing normalized limit values can be assumed as a GNG.

This is then used to calculate the decision value:

$$Ew = W_{v1}*(a_1 Sg_1^2 + (1-a_1)Sg_1) + W_{v2}*(a_2 Sg_2^2 + (1-a_2)Sg_2) + W_{v3}*(a_3 Sg_3^2 + (1-a_3)Sg_3) + \ldots + W_{vn}*(a_n Sg_n^2 + (1-a_n)Sg_n)$$

Now, with the differing verification methods having equal significance, the weighting factors can again be made equal to 1/n.

If Ew now exceeds or falls below a fixed limit value for GNG, the control commands for emphasizing (e.g. through 3D generation of a speaker image) in 60 are forwarded or blocked. The process can be similar if only activation or deactivation signals are to be forwarded.

From the received message, only the successfully verified sender pictures assigned to the corresponding addresses are stored in the archive memory 90 for sender pictures/videos, such that, subsequently, only the images/videos whose previous verifications, in comparison with the reference model from 50 or 90, determined via the address, had produced a minimum value of correspondence (confidence) with the reference model are also used, if necessary, to generate the 3D image (see a, b, c).

1) In the case of a 2D recording of a video message of an individual speaker, it is assumed, in the method provided, that a picture for the right eye (right picture) or left eye (left picture), necessary for a 3D representation, is therefore already present for each picture of the video sequence.

A video is understood here as a sequence of single pictures.

Thus, for complete 3D representation, a second picture of a person, or of the person's face, must be generated for the respectively other eye. For the purpose of exemplary, simplified description of the 3D generation method, it is assumed in the following that the existing picture is rated as an existing right picture (right picture). The left picture (left picture) must thus remain to be generated for each picture of the video sequence.

Before the left picture necessary for the 3D generation can be compiled, however, it is appropriate to check whether the speaker imaged on at least one picture of the video sequence, or at least one of the imaged speakers, corresponds to an image possibly obtained earlier and stored in 50 or 90, which image is identifiable through the sender address. In the case of successful verification of the individual speaker, outlines and coordinates of the position of the image corresponding to the sender are stored and, in a first step, the right picture is copied completely into the left picture, this in itself not resulting in a 3D effect. In the following steps, the image of the speaker is cut out of the now new left picture according to the stored outlines and the coordinates of the position, and replaced by a size-adapted image of the same speaker of the message from a perspective located further on the left. For this purpose, methods for automatic determination of outlines, cutting out, enlarging, reducing and inserting objects in pictures must be assumed to be known.

Figure 2A:
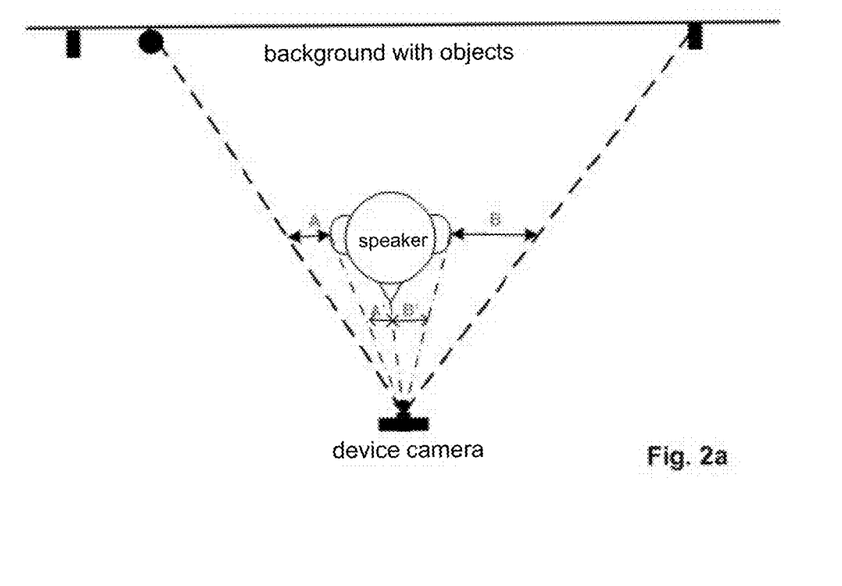
Figure 2B:
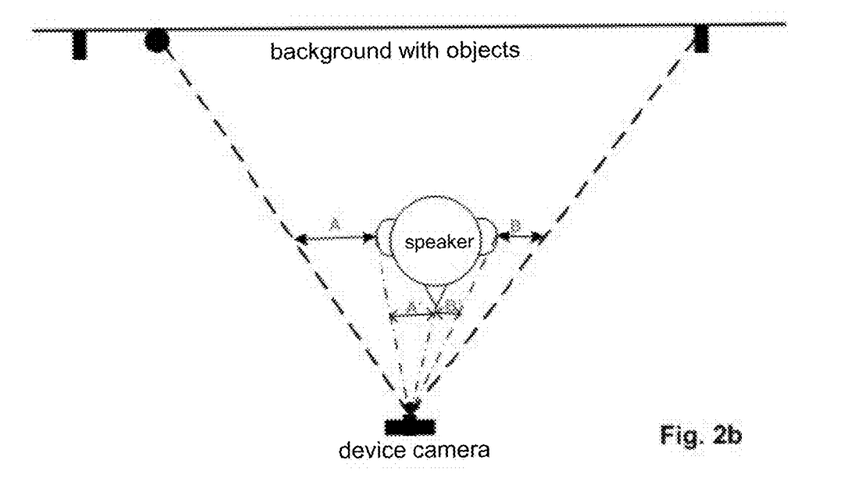
Figure 3A:
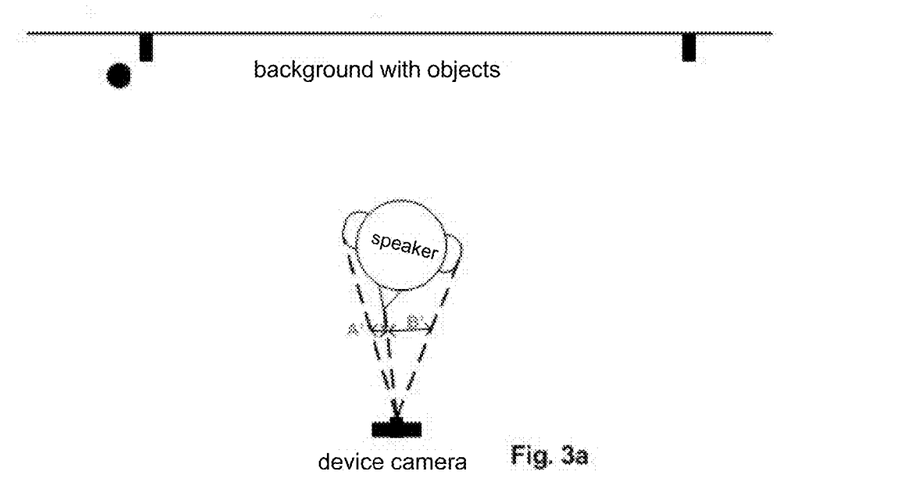
Figure 3B:
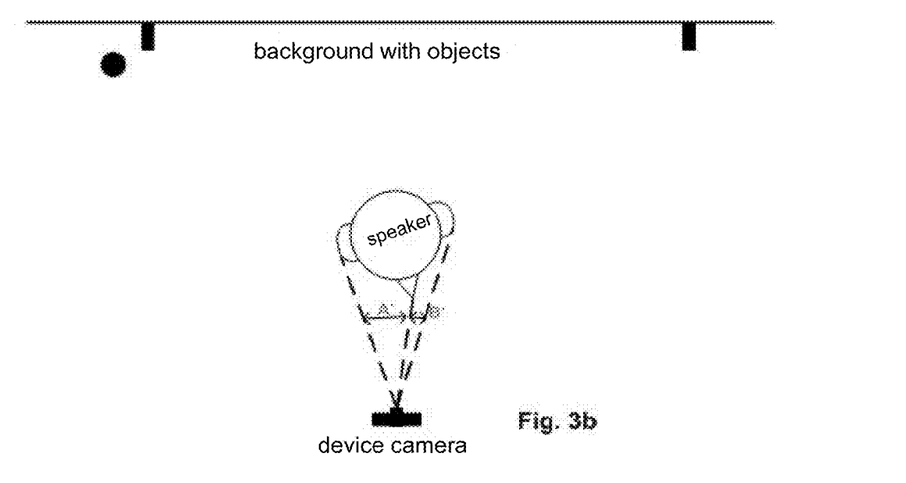

The image (cut-out) of the same speaker of the message from a perspective located further on the left is now obtained, for each single picture of the video sequence, from other pictures of the video sequence in those according to FIG. 2b or FIG. 3b, from which figures it is evident, according to the drawing, on the basis of the shortened distances B and/or B' and elongated distances A and/or A', that the recording angle is located further to the left of the recording position of the original right picture. In this case, a possible maximum value and/or minimum value can be set for the ratio between B, B', A, A' from FIG. 2a and, respectively, B, B', A, A' from FIG. 2b, or between B, A from FIG. 3a and, respectively, B, A from FIG. 3b, according to the face size represented in the image, in order that the virtual 3D stereo base does not differ substantially from the average eye distance. If the left pictures are obtained from the currently received video sequence, the speaker can thus be verified for each additional single picture by means of the method described above. In this case, vertical size ratios are also ascertained, in addition to the horizontal ratios between B, B', A, A' represented in FIGS. 2 and 3, in order to ensure that the additional left picture is obtained from a recording region in which the horizontal plane does not differ, or differs only slightly within defined limit values, from the horizontal recording plane of the assigned right picture.

If the left pictures are obtained from the currently received video sequence, the speaker can thus be verified for each additional single picture by means of the method described above.

If no further left picture, i.e. no further picture from a position located further on the left, can be found for individual right pictures from the video sequence, in these marginal cases, a right picture matching the now existing left picture (the right picture was copied into the left picture) can thus also be added from another image of the video sequence, having regard to the relations between B, B', A, A' from FIG. 2b and, respectively, B, B', A, A' from FIG. 2a, or between B, A, from FIG. 3b and, respectively, B, A from FIG. 3a. Here, the above-mentioned minimum and/or maximum values should likewise be observed in the selection.

If the virtual stereo base defined by the minimum and/or maximum values is not within particular limits, this can result in a pulsing of the 3D effect.

Missing left or right pictures of the sender that are to be supplemented can be obtained, additionally, from pictures/videos of historical messages of the same sender, which are stored and verified in 90.

If no further left picture, i.e. no further picture from a position located further on the left, can be found for individual right pictures from the video sequence, in these marginal cases, a right picture matching the now existing left picture (the right picture was copied into the left picture) can thus also be added from another image of the video sequence, having regard to the relations between B, B', A, A' from FIG. 2b and, respectively, B, B', A, A' from FIG. 2a, or between B, A, from FIG. 3b and, respectively, B, A from FIG. 3a. Here, the above-mentioned minimum and/or maximum values should likewise be observed in the selection.

If the virtual stereo base defined by the minimum and/or maximum values is not within particular limits, this can result in a pulsing of the 3D effect.

Missing left or right pictures of the sender that are to be supplemented can be obtained, additionally, from pictures/videos of historical messages of the same sender, which are stored and verified in 90.

2) If, from the received message, there is only a single image (e.g. rated as a right picture) of the possible speaker (photo), this image is verified according to the methods described above, and their results are combined, if appropriate, as described above. Following successful verification, here, likewise, outlines and coordinates of the position of the image corresponding to the sender are stored, and, in a first step, the right picture is copied completely into the left picture yet to be generated for the 3D format, and the image of the speaker from the now new left picture is cut out, according to the stored outlines and the coordinates of the position, and replaced by a size-adapted image of the same speaker of the message from a perspective located further to the left.

The image (cut-out) of the same speaker of the message from a perspective located further on the left is now obtained from pictures from pictures and/or videos that originate from earlier messages and that were stored in 90 together with reference to the sender address and information representing the right/left proportions of the image of the sender (e.g. quotient of A' and B'). For the purpose of monitoring the right/left proportions, the ratios of the distances of differing distinctive regions of the face, such as, for example, eyes, mouth, ears, nose, chin, etc., can be selected and marked and, following the calculation of the features that determine proportion, the latter are archived in 90 with reference to the respective picture.

In the selection of the picture to be supplemented, it is ensured that a possible maximum value and/or minimum value for the ratio between B, B', A, A' from FIG. 2a and, respectively, B, B', A, A' from FIG. 2b, or between B, A, from FIG. 3a and, respectively, B, A, from FIG. 3b are not exceeded or unattained, according to the face size represented in the image, in order that here, likewise, the virtual 3D stereo base does not differ substantially from the average eye distance.

In the methodology described, the right picture can clearly also be copied, as an existing right picture, into the left picture, the latter then being modified as described above for the left picture.

In both cases (video and photo), the 3D images of the speaker generated from at least two 2D images having differing perspectives are again adapted in their size to the speaker size in the 2D image and inserted, according to the orientation of the speaker in the original message, into the picture representation or video representation of the speaker in the now modified original message (43b, 44b), insertion also being understood, in principle, to include the addition of at least one second picture from a further perspective.

The orientation of the speaker in the 2D message is determined through the evaluation of the position of significant features of the face and/or body, such as, for example, the position of the hairline, eyes, nose, lips and/or ears in relation to the distance from the limits of the body, an almost symmetrical facial structure being assumed in the case of the face being directly aligned on at least one recording camera.

Since the orientation of the speaker in the 3D representation is dynamically adapted to the original orientation in the 2D representation, the representation of lip movements can also be accepted for the single pictures of a video message, each of which then has the same orientation, with slight impairments of quality being accepted.

In the case of computer-aided, automatic insertion of picture 3D representations of a person into a picture segment that was originally occupied by a 2D representation of the same person, there is a slight risk of regions being produced, at the edges of the inserted picture representation of this person, which are neither covered by the new picture representation of the person nor by the original background. Here, it is possible to effect a slight enlargement of the insertion and, if appropriate, of the first original picture, in the calculated segment, by a defined value, or to effect a dynamic enlargement, according to a calculated mis-cover, until the limit region of the greatest mis-cover region covers the limit of the greatest mis-cover region. Conversely, a slight compressing of the background in relation to the inserted image is likewise possible, as described, for example, in DE69628662T2.

Generally, pure text messages (41) in the original do not have picture or video recordings that are to be replaced or that can be verified. In order for these messages to be supplementarily provided with a 3D image or a sequence of 3D images (video) of the sender that can be played during display/reproduction of the message, in this case the address of the sender can be used directly in order to determine the verified pictures from 90 necessary for generating the one supplementing 3D image (41b). For this purpose, in the data area 90, all already obtained and verified images of a sender are stored in conjunction with the sender's identification/address information and are called up if required, in the case of generation of 3D images for this speaker or for the purpose of verifying new picture information of a speaker on the basis of the address identification assigned to the original message.

Generally, voice messages (42) in the original also do not have picture or video recordings that are to be replaced or that can be verified. Here, however, it is possible, for the purpose of verification (70) of the speaker, i.e. for the purpose of checking whether the reference voice model from 90 and/or 50 assigned, if appropriate, to the sender address/identification of the current message corresponds to the voice of the speaker of the current voice message. If this is the case, the address information assigned to the speaker in a protected manner is used to call up verified images of the latter that may be present in 90, for the purpose of generating a supplementing 3D image (60). This generated 3D image is then used to generate an avatar, which resembles the sender in the image and which, on the basis of the evaluation of the phonetic features of the voice message, with adaptation of the mouth movements, reproduces the spoken message according to know speech synthesis methods (source-filter model, formant synthesis, acoustic model, articulatory synthesis, overlap add, etc.).

The key elements of the process of generating 3D images from 2D pictures/picture sequences of a sender are represented in FIG. 1.

In addition thereto, phonemes/phoneme sequences/syllables/words/phrases, stored in 90, of the speakers of voice and/or video messages can be used to apply the speech synthesis method Unit Selection to texts from 41, according to the transmitted address identification (in this case, also used as a speaker identification).

On the basis of the ascertained sender address of the text message, corresponding speech fragments of the sender, who is verified analogously through his voice (see 70), are searched for in 90, in order to generate a voice message from the transmitted text. A 3D avatar (see above), likewise generated by means of the sender address from 2D images of the sender, can now acoustically reproduce the text message through the thus generated speech output of the text, with adaptation of the mouth movements. In this way, a voice and 3D video message is generated from a simple text message.

Thus, as collected voice fragments of the sender can be used to generate a speech output of text messages with the sender's voice, in principle a different voice can also be set by the recipient for the message, (e.g. through modification of the originally ascertained sender address or of an identifier that is used, in principle, as a reference to the required voice, to a different value), which voice can additionally express emotional fluctuations of the speech output, by means of identifiers inserted in the text.

The image and/or voice of the sender can be modified, e.g. as required by the message recipient or the operator of the mailbox system. For this purpose, the sender identification/address ascertained from the received message is replaced by an address/identification (100) that can be set by the message recipient and, for the purpose of 3D generation of the single pictures, or for the purpose of generating the reproduction voice, picture or voice fragments are searched for in 90, for the purpose of generating the 3D images, or speech output of a new speaker, according to the now predetermined address/identification.

In addition to the direct selection of the image and/or of the voice during the reproduction, selection parameters can contain the modifications in the user profile (100) managed by the recipient.

Here, likewise, is the memory location for information that defines further forms of the 3D generation.

In the simplest case, as described above, a 2D video message of the sender is used to generate a 3D video of the sender, through evaluation of sender information (e.g. through the transmitted sender address), or a 2D single picture of the user accompanying the message is used, likewise through evaluation of the sender information (e.g. through the transmitted sender address), to generate a 3D single picture of the sender, consisting of two 2D pictures.

Another setting in the user profile can mean that, in place of a received 2D single picture associated with a voice message, or in place of a voice message without a picture, a preferred 3D video of the sender, which has already been generated once and stored in 90, is to be played once again with the voice message of the currently received message. Since the lip movements of the recorded sender are now no longer synchronous with the currently spoken message text, an adaptation of the lip movements must be performed. Known from the generation and application of avatars are visem-phoneme assignments, wherein, for the speech output of written text, virtual, artificial characters speak this text with correspondingly modelled lip movements. Likewise known are speech recognition methods, which can extract not only words, but also phoneme sequences (sound sequences) from a given speech flow. For each language/each dialect there exists a limited number of possible phonemes, and therefore also a limited number of possible phoneme transitions. In German, approximately 40 phonemes are assumed, depending on dialect. In the given case, the phoneme sequences of a sender or other speaker are extracted from the selected archived (historical) video message by means of the speech recognition system, and stored together synchronously with the corresponding mimic sequences as phoneme-visem combinations. The same is additionally performed for the storage of phoneme transitions and the corresponding visems. Here, for example, entire picture sequences, including the speaker background, as well as only the cut-out 3D faces, or mouth cut-outs, can be considered here as visems of a sender or other, possibly also artificial speaker. Visem collections assigned to individual speakers are likewise linked to the addresses of these speakers.

Subsequently, the current voice message that is to be converted to a video message is likewise analysed for phoneme sequences and transitions. If all phoneme sequence and transitions are contained at least once in the archived video message, then, according to the phoneme sequences and transitions of the current voice message, the corresponding picture/visem sequence is added synchronously in relation to the phoneme sequence of the current message.

If not all phoneme sequences and/or transitions of the current message are contained in an archived preferred video message, the phoneme sequences and transitions are evaluated to search for further archived 3D messages (e.g. 2D, 3D audio, etc.) of the same sender that contain the additionally required phoneme sequences and transitions. On the basis of differing backgrounds and colour nuances, according to the examples above only the face or head representations of the speaker are cut out from the corresponding visem sequences, for example, and inserted, with adaptation of size/colour/edge, into picture sequences of the preferred video message.

If 3D images of persons other than those of the senders are inserted in the predetermined picture region, in front of the original background, then, as already described, either an enlargement of the insertion, by a defined, greater value, or again a dynamic enlargement, according to a calculated mis-cover, can be performed, until the limit of the mis-cover region is achieved.

Thus, as described here for message speakers, static objects in picture and/or video messages that have been identified by picture recognition methods can also be provided with identifications and modified in the message to form 3D images (e.g. buildings as background objects).

An additional supplement is constituted by the insertion of another background in dependence on the ascertained whereabouts of the sender if the message. If, for example, in the case of a picture message or video message being left or sent via a mobile terminal device, it is ascertained, through evaluation of the roaming information, that the sender of the message is located in a particular country, province or location, a new background picture can be inserted in dependence on this location. For this purpose, location-determining information is additionally stored in the text, voice and/or video mailbox system when a corresponding message is left.

The location-determining information associated with the left message can contain, 1) upon leaving of the message by a mobile terminal device, or a terminal device that enables the following information to be acquired, the
   a. cell ID of the cell of origin
   AND/OR
   b. the cell IDs of surrounding radio cells with corresponding signal travel times to the adjacent radio masts of the base stations
   AND/OR
   c. the position or position region calculated from these signals.

The travel times of signals to surrounding radio masts is likewise used in the so-called A-GPS method, to support locating by the GPS method 2) In the case of the message being left by a terminal device that does not receive location-determining radio signals, contain a country identification and/or a location area code, from which, if appropriate, the location of the terminal device can be deduced.

3) In the case of the message being left by a VoIP system, contain at least one IP address and the time at which a message is left, and/or DSLAM port addresses, from which determination of location can likewise be deduced.

The location-determining and/or sender address identification additionally serve to add to the message a location-dependent, or sender-dependent sound background that reinforces the embedding of the speaker in a three-dimensional environment, in that a variety of background sounds, recorded by multichannel recording, are mixed in with the modified message, in dependence on the location and/or sender. Thus, a previously stored background can be mixed into the picture, known methods for replacing a background being selected.

The 3D model of a speaker preferably consists of a multiplicity of 2D images, which are stored together with data that describes the perspective/orientation of a single 2D image.

The mailbox system 30, the 3D generation 60, the speaker recognition 70 and the face recognition 80, which are represented in FIG. 1, can be located locally, in their entirety or partially, on the terminal device. If the mailbox system, including 90, is located on the terminal device, there is available in 90, if appropriate. If the whereabouts of the sender of the message is of particular importance, a supplementary signal can be added to the sent message, which signal causes the mailbox system to generate a 3D image only from the background, in a manner similar to the method described above. For this purpose, likewise, the 2D original is duplicated and cut out in the copy of the background. This cut-out background is then replaced by the same background, including secondary objects, which was recorded from a different perspective. Equally possible is the insertion of location-dependent, pre-generated 3D backgrounds. In this case, the speaker would appear two-dimensionally.

The instigation to generate the 3D background can also be initiated by the recipient, through a direct signal or through a setting in the recipient profiles (100).

While the invention has been particularly shown and described with reference to preferred embodiments thereof, it will be understood by those skilled in the art that various changes in form and details may be made therein without departing from the spirit and scope of the invention.

The invention claimed is:

1. A computer-implemented method for emphasizing selected objects in digital data of at least one of pictures and video that is stored in digital messages, the messages including sender addresses and being stored in a memory system of a digital messaging system for a plurality of users, the method comprising:
   identifying, by a processor, picture regions including at least one of faces and persons in the digital data of the messages on the digital messaging system having the same sender address;
   determining, by the processor sender-relevant picture regions in the identified picture regions that represent a sender of the message based on at least one of:
      a) a comparison with a reference picture of the sender stored on the memory system;
      b) a comparison of speech data in the digital data with reference speech data using at least one of speaker recognition methods, speaker verification methods and speaker identification methods, taking into account picture data and speech data in the message; and
      c) a frequency of occurrence of the identified picture regions in the messages that have the same sender address; and
   modifying, by the processor, the digital data of the messages so as to emphasize the sender-relevant picture region;
   wherein the modification of the digital data is performed such that a recipient of the message can undo the modification via a menu dialog.

2. The method according to claim 1, wherein at least one of comparing the speech data in the message with the speech data of a video message and comparing the speech data of a plurality of video messages with one another, is performed so as to find the sender-relevant picture regions of the video messages when there is an overlap of voice messages.

3. The method according to claim 1, wherein at least one of a terminal device and a server accessible via a network is provided for a 3D generation, the speaker recognition methods and a face recognition, wherein parameters that characterize different perspectives of images of the sender in the messages are stored in at least one of a memory system of the server and a local memory of a mobile terminal device.

4. The method according to claim 1, wherein a background is selected and inserted based on an ascertained location of the sender of the message.

5. A computer-implemented method for emphasizing selected objects in digital data of at least one of pictures and video that is stored in digital messages, the messages including sender addresses and being stored in a memory system of a digital messaging system for a plurality of users, the method comprising:
   identifying, by a processor, picture regions including at least one of faces and persons in the digital data of the messages on the digital messaging system having the same sender address;
   determining, by the processor, sender-relevant picture regions in the identified picture regions that represent a sender of the message based on at least one of:
      a) a comparison with a reference picture of the sender stored on the memory system;
      b) a comparison of speech data in the digital data with reference speech data using at least one of speaker recognition methods, speaker verification methods and speaker identification methods, taking into account picture data and speech data in the message; and
      c) a frequency of occurrence of the identified picture regions in the messages that have the same sender address; and
   modifying, by the processor the digital data of the messages so as to emphasize the sender-relevant picture region;
   wherein the identified picture regions are used to generate a 3D model.

6. The method according to claim 5, wherein the 3D model includes a plurality of 2D images, which are stored along with parameters that describe a perspective of one of the 2D images.

7. A computer-implemented method for emphasizing selected objects in digital data of at least one of pictures and video that is stored in digital messages, the messages including sender addresses and being stored in a memory system of a digital messaging system for a plurality of users, the method comprising:
   identifying, by a processor, picture regions including at least one of faces and persons in the digital data of the messages on the digital messaging system having the same sender address;
   determining, by the processor, sender-relevant picture regions in the identified picture regions that represent a sender of the message based on at least one of:
      a) a comparison with a reference picture of the sender stored on the memory system;

b) a comparison of speech data in the digital data with reference speech data using at least one of speaker recognition methods, speaker verification methods and speaker identification methods, taking into account picture data and speech data in the message; and c) a frequency of occurrence of the identified picture regions in the messages that have the same sender address;

modifying, by the processor, the digital data of the messages so as to emphasize the sender-relevant picture region;

storing a sender-relevant 2D picture region of the identified picture regions along with the sender address and parameters that characterize a first perspective of the sender image;

transferring the sender-relevant 2D picture region and further sender-relevant picture regions from past messages from the memory system to a module for generating 3D picture data;

determining, by the processor, the first perspective of the sender-relevant 2D picture region based on imaged body proportions;

searching, by the processor for a second 2D image having parameters that characterize a second perspective in the same horizontal plane so as to provide a 3D impression by evaluating ratios of body proportions;

adapting, by the processor, a size and color of the second 2D image; and generating, by the processor, at least one 3D image of the sender by supplementing the sender-relevant 2D picture region with a second picture region including a sender image that is copied from the second 2D image, cut out and replaced by a picture from a different perspective.

8. The method according to claim 7, wherein searching for the second 2D image is first performed in a current message for the picture from the different perspective using face recognition methods in the case of a plurality of persons being present and, if a usable one of the picture from the different perspective is not found in the current message, then searching is performed on the memory system, in which case, proportions of features of the sender image are checked in additionally found ones of the picture from the different perspective to determine compliance with predefined limit values that describe a horizontal recording plane and a vertical recording plane.

9. A digital messaging system having a plurality of person-related messages stored on a memory system, the messages being provided with sender addresses and at least a portion of the messages including digital data of at least one of pictures and video, the digital messaging system comprising a processor and a non-transitory processor-readable medium having processor-executable instructions stored thereon, the processor-executable instructions comprising a plurality of units, the plurality of units comprising:

an identifying unit configured to identify picture regions having at least one of faces and persons in the digital data of messages that have the same sender address;

at least one calculation unit configured to determine, from the identified picture regions, sender-relevant picture regions that represent a sender of the message based on at least one of:

a) reference pictures that are stored on the memory system, b) a comparison of speech data in the digital data with reference speech data using speaker recognition methods and taking into account speech data in the message, and c) a frequency of occurrence of sender-relevant picture regions in the messages that have the same sender address;

a modification unit configured to modify the digital data of the messages that are received by emphasizing the sender-relevant picture regions; and an undoing unit configured to undo the modification by the recipient using a menu dialog.

10. The digital messaging system according to claim 9, further comprising:

a first digital interface configured to store a sender-relevant 2D picture region in conjunction with the sender address and parameters that characterize a perspective of a sender image; and a second digital interface configured to transfer the sender-relevant 2D picture region and further sender-relevant picture regions from past messages from the memory system to a module for generating 3D picture data, the calculation unit being configured to determine a perspective of the sender-relevant 2D picture region based on imaged body proportions;

wherein the plurality of units further comprise a search unit configured to search for a second 2D image having parameters that describe a different perspective in the same horizontal plane so as to provide a 3D impression through evaluation of ratios of body proportions; and wherein the calculation unit is configured to generate at least one 3D image of the sender of the message by supplementing the sender-relevant 2D picture region with a second picture region including a sender image that is copied from the second 2D image, cut out and replaced by a picture from the different perspective.

11. The digital messaging system according to claim 9, wherein the search unit is configured to search first for the second 2D image in a current message using face recognition methods, when a plurality of persons are present, and, if no usable one of the picture from the different perspective are present in the current message, then the search unit searches an archive memory of the digital messaging system, in which case, proportions of features of the sender image of additionally found pictures from a different perspective are determined for compliance with predefined limit values that describe a horizontal recording plane and a vertical recording plane.

12. The digital messaging system according to claim 9, wherein the calculation unit is configured to compare at least one of the speech data of the message with the speech data of the video message and the speech data of a plurality of the video messages with one another, so as to find the sender-relevant picture region in the video message, if there is an overlap of voice messages.

13. The digital messaging system according to claim 9, wherein the calculation unit is disposed at least partially on at least one of a terminal device and a server accessible via a network, wherein parameters that characterize different perspectives of sender-relevant picture regions of the messages are stored in at least one of a memory system of the server and a memory of a mobile terminal device.

14. The digital messaging system according to claim 10, wherein the 3D image includes a plurality of 2D images, which are stored on the memory system in conjunction with data that describes the perspective of one of the 2D images.

15. The digital messaging system according to claim 9, further comprising an insertion system configured to insert a background based on an ascertained whereabouts of the sender of the message.

\* \* \* \* \*